Patented July 8, 1941

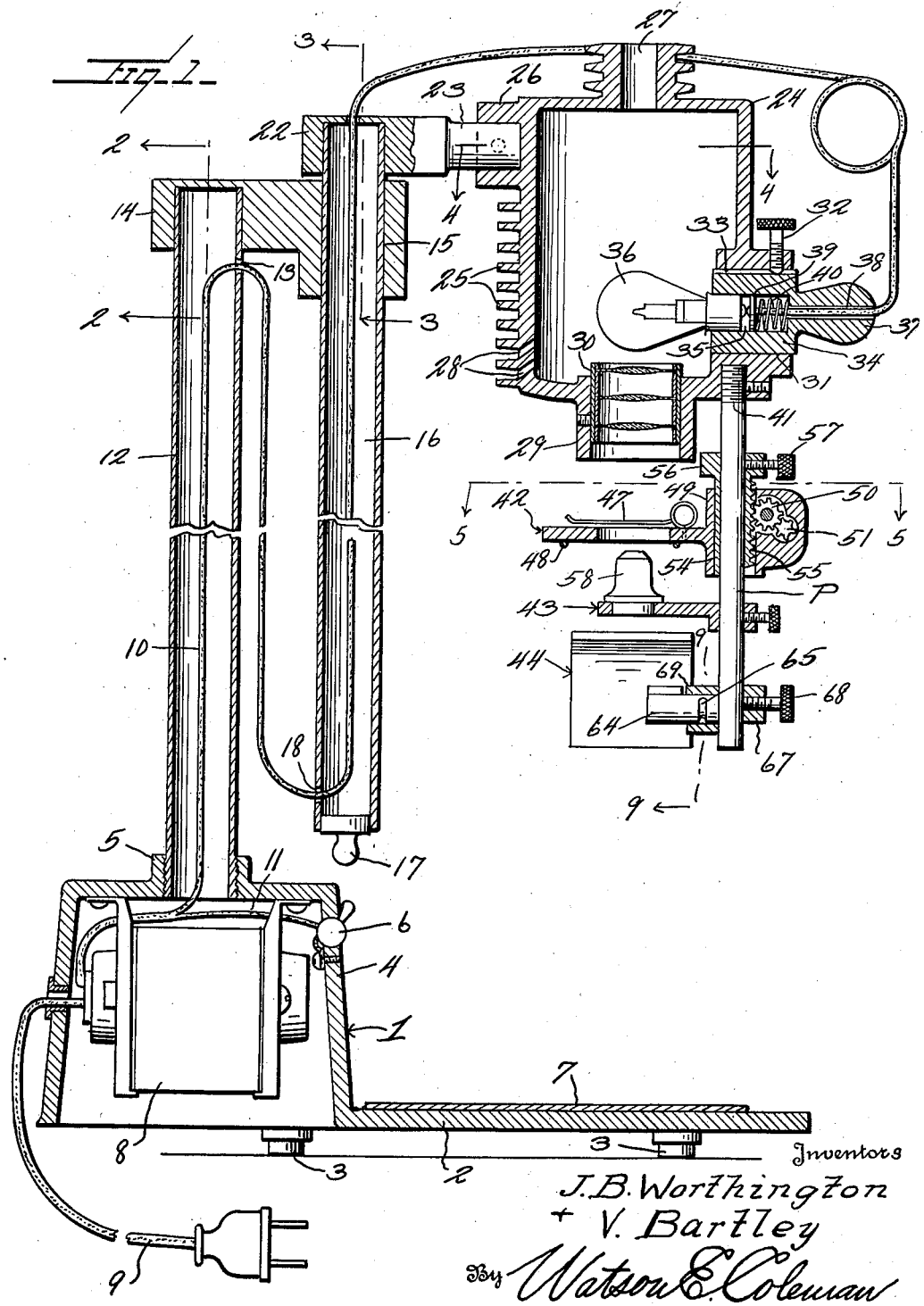

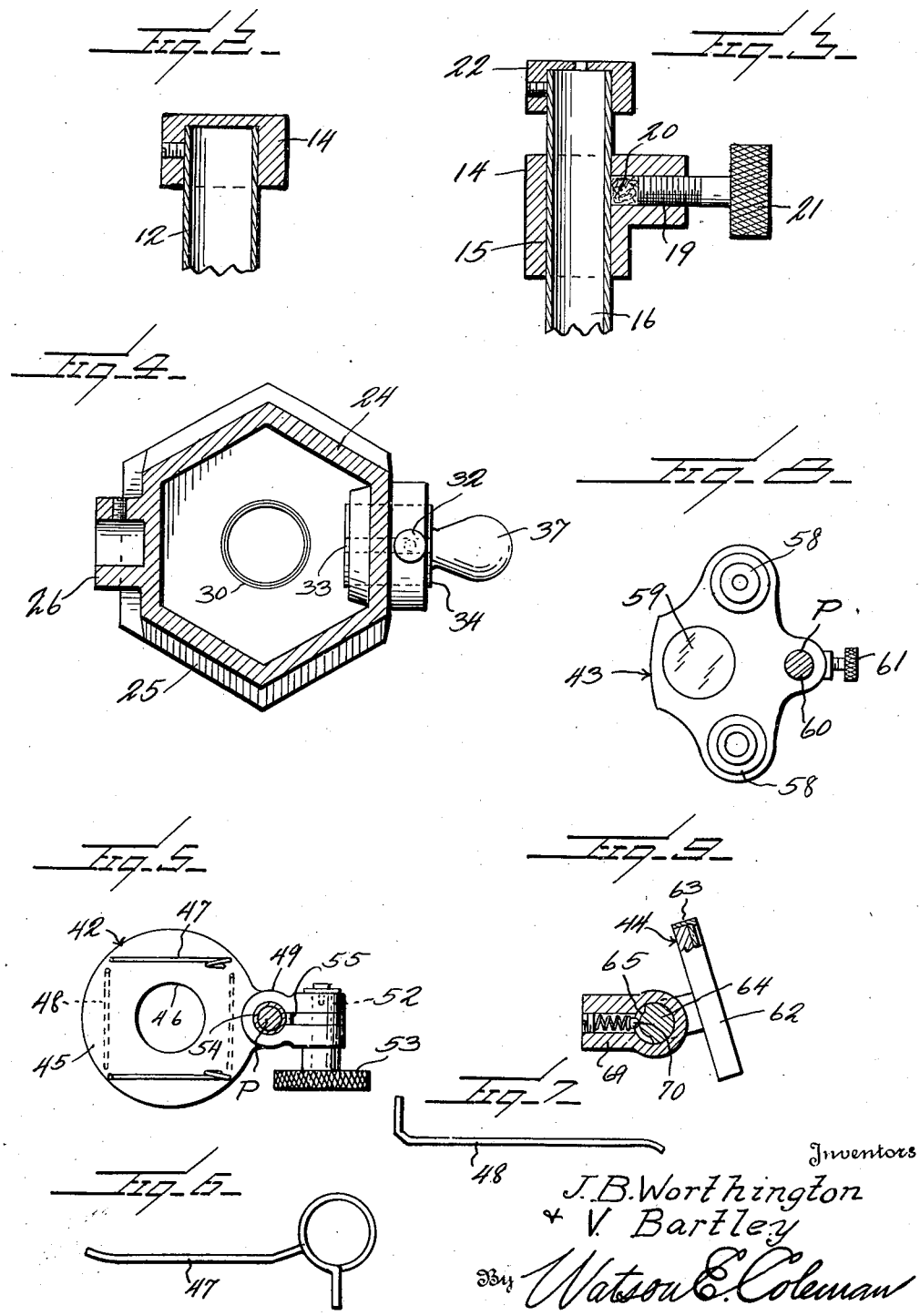

2,248,210

UNITED STATES PATENT OFFICE 2,248,210

MICROSCOPE PROJECTOR

James B. Worthington and Victor Bartley, Oklahoma City, Okla.

Application December 2, 1939, Serial No. 307,322

6 Claims. (Cl. 88—24)

This invention relates generally to the class of optical instruments and pertains particularly to an improved microscope projector of the type designed for use in classes of biology or other science classes where a study is made of specimens from the animal and vegetable kingdoms.

The present invention has for its primary object to provide an improved instrument whereby microscopic objects may be enlarged and projected from the instrument either upon an adjacent underlying plate or may be projected laterally from the instrument onto a wall screen or the like so that a study of the object may be conveniently made by a number of students.

A further and more specific object of the invention is to provide in a microscope projector, a new and novel means for adjustably supporting a light housing together with a lens system, specimen stage, objective stage and mirror in a unique manner whereby all of such parts may be firmly maintained in a desired adjusted relation or individual parts may be adjusted as may be necessary, to bring a specimen into a proper focus with respect to an objective lens, so that an enlarged reproduction of the specimen may be thrown by the mirror to an observation screen.

A still further object of the invention is to provide in a microscope projector of the type above stated, a novel housing means for an incandescent lamp whereby the heat from such lamp is readily dissipated away from a specimen under examination, thus facilitating an extensive examination and study of living biological specimens.

Still another object is to provide in a projector of the character described, an improved housing for an incandescent lamp wherein the lamp is mounted in such manner that it may be readily removed for replacement when desired without having to alter the relative positions of the housing and other parts carried thereby and whereby the current conducting means for such incandescent lamp is protected against damage by heat from the lamp.

A still further object is to provide a novel microscope projector including a lamp housing and lens system, specimen and objective stages and a mirror all connected together as a unit and supported in a novel manner with respect to a horizontal screen whereby the unit may be vertically adjusted relative to said screen.

Other objects and advantages of the present invention will become apparent as the description of the same proceeds and the invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a vertical longitudinal section through the instrument.

Fig. 2 is a section on the line 2—2 of Fig. 1.

Fig. 3 is a section on the line 3—3 of Fig. 1.

Fig. 4 is a section on the line 4—4 of Fig. 1, with portions of the structure removed.

Fig. 5 is a section on the line 5—5 of Fig. 1.

Fig. 6 is a view in elevation of the specimen plate holder.

Fig. 7 is a view in elevation of the film holder for the specimen stage.

Fig. 8 is a view in plan of the objective stage.

Fig. 9 is a sectional view on the line 9—9 of Fig. 1, with a portion of the mirror structure broken away.

Referring now more particularly to the drawings, the numeral 1 generally designates the base of the present projector instrument and this base comprises a plate 2 which is horizontally supported upon suitable feet 3, a portion of the plate being formed or cast to provide the upstanding housing 4 which in the completed instrument is at the back of the base and which is open upon its underside as illustrated. The central top part of the housing 4 has a threaded bossed opening 5 formed therethrough and in the front wall of this housing is mounted a control switch 6.

The horizontal forward portion of the plate 2 has secured to the top thereof a plate of porcelain 7 or other suitable white material which may be satisfactorily employed as a screen upon which an enlargement of a specimen may be projected.

The housing 4 is designed to contain a suitable transformer unit 8 which will supply current at a reduced voltage from a standard house lighting circuit to the projector lamp hereinafter described and there is shown a conductor wire 9 of the two-strand type which leads to the transformer unit and from the transformer unit there extend the single wires 10 and 11, one of which leads to the switch 6 while the other one leads to the projector lamp. One side of the switch 6 is grounded to the frame of the instrument and the other side of the projector lamp is also grounded to the frame of the instrument so that the necessary circuit will be completed when the switch is closed as will be readily understood.

Secured in the bossed opening 5 of the transformer housing 4 is one end of a vertical tubular standard 12 through which a portion of the wire 10 passes to and through the aperture 13 at the upper end of the standard.

The upper end of the standard 12 has secured thereto and supports a head 14 which is provided with a vertically extending guide 15 and there is slidably extended through this guide 15 the shiftable standard 16 which is also in the form of a tube, the lower end of which is closed by a suitable plug or cap 17. The lower end of this shiftable standard also has a wall aperture 18 through which the wire 10 passes from the aperture 13, a portion of the wire being outside of the relatively movable tubular standards as shown, and the wire then passes from the aperture 18 upwardly and through the top of the shiftable standard 16 as illustrated. In order that the shiftable standard 16 may be secured in a vertically adjustable position in the head 14, the head is provided with a laterally extending threaded bore 19 which opens into the guide sleeve 15 and in the inner end of this bore is located a fibre friction member 20 which is forced inwardly against the side of the standard 16 by the headed screw 21 which is threadably engaged in the bore.

The upper end of the shiftable tubular standard 16 has secured thereto above the head 14, the short laterally extending arm 22 which extends in the same direction as the head 14 and is formed at its outer end to provide the terminal pin 23 for the purpose about to be described.

The numeral 24 designates the incandescent lamp housing which as shown is in the form of a vertically disposed elongated body having formed integral with its outer surfaces the encircling or partially encircling fins 25 for the dissipation of heat from the walls of the housing. Adjacent its upper end the lamp housing is provided with a suitable socket 26 for the reception of the pin of the arm 22 so that the housing is suspended from this arm in the manner shown. At its upper end the lamp housing is provided with a warm air outlet aperture 27 and adjacent its lower end the side wall is provided with apertures or openings 28 by which air may enter the housing to carry heat, generated therein by the enclosed electric lamp, upwardly and through the opening 27. In its lower end, the lamp housing is formed to provide the axially directed sleeve 29 in which is fixed a suitable lens system, which is indicated generally by the numeral 30.

The side wall of the lamp housing is provided, preferably oppositely from the boss 26, though not necessarily so, with the guide opening 31 which is bossed at its inner and outer ends, as shown, and the outer boss of the opening has threaded therethrough a set screw 32 which extends into the guide opening for engagement in a groove 33 which is formed longitudinally of the outer surface of the cylindrical incandescent lamp carrier 34. This lamp carrier has formed therein from one end, a socket 35 in which is fitted the base of the incandescent lamp 36, and at the outer end of the carrier there is formed the handle 37 by which the carrier is moved inwardly or outwardly of the guide opening. Extending through this handle and opening into the socket is a passage 38 for the reception of the end of the conductor wire 10, and within the socket of the wire is secured to a suitable insulation disk 39, and this disk is normally urged forwardly toward the outlet end of the socket by the spring 40 which is partially compressed when the base of the incandescent lamp is secured in the socket, thus serving to maintain a firm electrical contact between the end of the conductor wire and the center terminal of the lamp base. The other terminal of the lamp base is, as previously stated, grounded to the carrier, and since all of the parts of the structure are of metal, the connection is thus set up between this side of the base and the said grounded side of the control switch 6.

The lamp housing is provided with a suitable threaded socket 41 which is directed downwardly along a path parallel with the axis of the lens system and in this socket is secured one end of a fixed parts supporting post P. On this post is supported a specimen stage, indicated generally by the numeral 42, and disposed directly beneath the lens system 30, is an objective stage indicated generally by the numeral 43 and disposed directly beneath the specimen stage, and a mirror 44 disposed directly beneath the objective stage. These parts and the manner of their mounting on the post will be individually described in the order in which they are numbered.

The specimen stage 42 comprises a flat body 45 having a central opening 46 and upon the top of the body at opposite sides of the opening are secured the specimen plate securing springs 47. Upon the under side of the body of the specimen stage there are secured spring arms 48 which are disposed at opposite sides of the opening 46 and at right angles to the plate securing arms 47. These latter arms are for holding films of the 8 m. m. size.

Integral with the specimen stage body there is formed a sleeve 49, the axis of which is parallel with the axis of the aperture 46, and this sleeve has an enlarged back portion in which are housed a pair of gear pinions 50 and 51, which are in mesh with one another and in which the pinion 50 has its periphery projecting into the sleeve 49 while the pinion 51 is carried upon the shaft 52 of an adjusting wheel 53. The shaft 52 is, of course, rotatably supported in the rear part of the sleeve 49.

The sleeve 49 receives an inner sleeve 54 through which the post 42 extends and the sleeve 54 carries a longitudinally extending toothed rack 55 with which the pinion 50 meshes. The upper end of this rack sleeve has a head 56 which carries a set screw 57 which engages the post 42 to hold the rack sleeve, and also the specimen stage, in position on the post. By means of this set screw, a rough vertical adjustment of the specimen stage may be made and after completing such rough adjustment, the screw 57 will be engaged with the post and then a finer adjustment of the stage can be made by turning the wheel 53.

The objective stage 43 consists of a flat body, horizontally disposed, which has apertures for the support of two objective units 58 and a lens 59. This objective stage body is formed to provide a sleeve 60 through which the post P passes, and a set screw 61 passes into the sleeve for engagement with the supported post.

The mirror 44 comprises the reflector body 62 which is mounted in a suitable frame 63 and the back of this frame has connected therewith a laterally extending pin 64 which projects beyond the edge of the frame and which has formed in the projecting portion the partially encircling groove or channel 65. Coupled with this pin is a body 66 which has a sleeve or guide opening 67 formed therethrough for the reception of the supporting post 42 and the body 60 also carries a set screw 68 which engages the post to hold the body against movement thereon. The body 60 is provided with a laterally directed socket 69 in which the pin 64 of the mirror frame is snugly positioned for oscillation. The body 60 also carries a spring pressed ball 70 which extends partially into the socket 69 for frictional engagement in the groove 65 of the mirror frame pin. Since the socket 69 is disposed to extend perpendicular to the sleeve 67, it will be seen that the face of the reflector may be oscillated to any desired angle to receive an image projected from an overlying objective 58 so as to throw the image laterally from the instrument to a laterally disposed screen.

From the foregoing, it will be readily apparent that the structure herein described is of a compact form and that the height of the projector from the underlying horizontal screen 7 may be readily adjusted as may be necessary, to bring the object being examined to the clearest and greatest degree of sharpness and that also the object under examination may be readily projected laterally by means of the reflector or mirror unit 44 onto a vertical wall screen. It will also be seen that with all of the parts supported upon the single post P which is carried by the light projector or housing 24, the several elements may be arranged and fixed in a desired position with a minimum of effort.

By the novel provision of the guide opening in the lamp housing and of the lamp carrier which is insertible in the guide opening and which permits of the introduction of the lamp through the opening into the housing, it will be readily seen that if it is necessary to replace a lamp when the objective is in focus while using the instrument, this may be easily done without changing the adjustment of any of the parts, and that when replacing the carrier, it is merely necessary to move the same inwardly until the rays from the light pass through the objective in the proper manner, as will be evidenced by the return of the projected image of the object to its previous degree of clearness. The lamp holder may then be secured by tightening the screw 32 in the slot 33.

By the use of the present instrument, because of the novel arrangement of the parts and the provision whereby the heat from the incandescent lamp is carried off from the housing, it is possible to study the circulation of blood, the heart beat, cell division, cell conjugation and the many other wonders of microscopic animal life for indefinite periods of time. The process of cell division can actually be watched from its beginning to end with the same cell, there being no destructive heat to kill the delicate one-cell animals. Because of the arrangement for projecting images upon a screen, student groups are able to see the flowing motion in the amoeba, elodea, etc., as well as observing the taking of food in one-celled animals and other phenomena of animal life.

What is claimed is:

1. A microscope projector, comprising a base having a horizontally disposed flat portion and a housing at one side of said flat portion, a vertically disposed tubular standard secured at one end in the top of said housing and extending upwardly therefrom, a head secured to the upper end of the standard and having a vertically disposed guide therethrough, a shiftable tubular standard extending through the guide of said head and maintained thereby parallel with the fixed standard, means for securing the shiftable standard in adjusted position in the guide, an elongated vertically disposed lamp housing secured to the upper end of said standard and having apertures in its upper and lower ends, a lens system in the lower aperture of the lamp housing and having its axis parallel with said standards, an incandescent lamp supported in the lamp housing in alinement with said lens system, said lamp housing having ventilating apertures in the lower part thereof, a post secured to the lamp housing and extending downwardly therefrom parallel to said lens system axis, a specimen stage adjustably supported on the post beneath the lens system, an objective adjustably supported on the post beneath said stage, and a mirror adjustably supported on the post beneath said objective and being adapted for disposition in the path of light rays passing downwardly through the objective for deflecting such rays to a receiving screen, said first housing being designed to enclose an electric current transformer and said tubular standards being designed to house a current conductor leading from the transformer to the incandescent lamp.

2. In a projector of the character stated, an incandescent lamp housing having a light emitting aperture, means supporting the housing with said aperture directed downwardly, the upper part of the housing having a ventilating aperture and the lower part of the housing adjacent the light emitting aperture having an air admitting aperture, said housing having a side wall provided with a guide opening, a body removably disposed in said guide opening and having an incandescent lamp socket in its inner end, the outer end of said body being formed to provide a handle, an electric current conductor passing longitudinally through said handle and into said socket, a lens supported in said light emitting aperture, a post secured at one end to the housing and extending therefrom in parallel relation with the axis of said lens, a rack carrying sleeve adjustably secured on said post, a specimen stage having a sleeve receiving said rack sleeve, gear means carried by the sleeve of the stage meshing with the rack of the first sleeve facilitating adjustment of the stage relative to said lens, a plate having a post receiving sleeve through which the post is extended whereby the plate is disposed beneath the specimen stage upon the opposite side of the same from the housing lens, a lens carried by said plate for axial alinement with the first lens through said stage, and a mirror supported upon the post for adjustment relative to the last-mentioned lens on a path extending perpendicularly to and longitudinally of the post.

3. In a projector of the character stated, an incandescent lamp housing having a light emitting aperture, means supporting the housing with said aperture directed downwardly, the upper part of the housing having a ventilating aperture and the lower part of the housing adjacent the light emitting aperture having an air admitting aperture, said housing having a side wall provided with a guide opening, a body removably disposed in said guide opening and having an incandescent lamp socket in its inner end, the outer end of said body being formed to provide a handle, an electric current conductor passing longitudinally through said handle and into said socket, a lens supported in said light emitting aperture, a post secured at one end to the housing and extending therefrom in parallel relation with the axis of said lens, a rack carrying sleeve adjustably secured on said post, a specimen stage having a sleeve receiving said rack sleeve, gear means carried by the sleeve of the stage meshing with the rack of the first sleeve facilitating adjustment of the stage relative to said lens, a plate having a post receiving sleeve through which the post is extended whereby the plate is disposed beneath the specimen stage upon the opposite side of the same from the housing lens, a lens carried by said plate for axial alinement with the first lens through said stage, a base plate having said housing supporting means secured thereto, and a projected image receiving plate carried by said base plate and disposed horizontally beneath said lens to receive a projected image therefrom.

4. In a projector of the character stated, an incandescent lamp housing having a light emitting aperture, means supporting the housing with said aperture directed downwardly, the upper part of the housing having a ventilating aperture and the lower part of the housing adjacent the light emitting aperture having an air admitting aperture, said housing having a side wall provided with a guide opening, a body removably disposed in said guide opening and having an incandescent lamp socket in its inner end, the outer end of said body being formed to provide a handle, an electric current conductor passing longitudinally through said handle and into said socket, a lens supported in said light emitting aperture, a post secured at one end to the housing and extending therefrom in parallel relation with the axis of said lens, a rack carrying sleeve adjustably secured on said post, a specimen stage having a sleeve receiving said rack sleeve, gear means carried by the sleeve of the stage meshing with the rack of the first sleeve facilitating adjustment of the stage relative to said lens, a plate having a post receiving sleeve through which the post is extended whereby the plate is disposed beneath the specimen stage upon the opposite side of the same from the housing lens, a lens carried by said plate for axial alinement with the first lens through said stage, a body supported upon said post beneath the lens carrying plate and adapted for adjustment longitudinally of the post, said body having a laterally directed socket, a mirror, a pin carried by the mirror and projecting beyond an edge thereof and adapted for engagement in said socket, and means engaging the pin in said socket for frictionally holding the pin against free rotation.

5. In a microscope projector of the character stated, a housing, supporting means for the housing, said housing having a light emitting opening, a lens system disposed within said opening, the housing having a side wall adjacent to said lens system provided with an opening, an annular flange integral with the housing and encircling said side wall opening, a relatively long body insertible into said side wall opening through said flange and having in one end an incandescent lamp bulb base receiving socket, said body at its other end being formed to provide an outwardly extending handle having an axial passage therethrough for the reception of an electric current conductor leading to said socket, said side wall opening being of a diameter only slightly greater than the diameter of an incandescent lamp secured in said socket, and means carried by said flange for engagement with said body for securing the body in a position of adjustment axially of the flange and opening, said body being adjustable in the opening to position the incandescent lamp in alinement with said lens system.

6. A microscope projector of the character described, comprising a base having a relatively wide flat top surface and formed at one side of said surface to provide an upstanding housing adapted to enclose a transformer unit, a tubular standard secured to the housing and extending vertically upwardly therefrom, a head upon said standard having a guide paralleling the standard, a shiftable tubular standard extending through said guide and adapted to be adjustably secured therein, a lamp housing secured to the upper end of the second standard and having a downwardly directed light emitting opening, said light housing being designed to enclose an electric lamp, the said flat top surface of the base being disposed directly beneath said light emitting opening to receive light therefrom, and a flexible electric current conductor leading from within the base housing through said standards to said light housing for connection with an incandescent lamp in the light housing, said conductor having a slack portion extending outside of and from one of the standards to the other.

JAMES B. WORTHINGTON.
VICTOR BARTLEY.